(12) United States Patent
Sumasu et al.

(10) Patent No.: US 8,711,804 B2
(45) Date of Patent: Apr. 29, 2014

(54) RETRANSMISSION CONTROL METHOD, BASE STATION AND MOBILE STATION

(75) Inventors: Atsushi Sumasu, Kadoma (JP); Hidenori Kayama, Sendai (JP); Hiroki Haga, Sendai (JP); Masayuki Hoshino, Kadoma (JP); Katsuyoshi Naka, Kadoma (JP); Junya Yamazaki, Sendai (JP); Ryohei Kimura, Kadoma (JP)

(73) Assignee: Panasonic Corporation, Osaka (JP)

( * ) Notice: Subject to any disclaimer, the term of this patent is extended or adjusted under 35 U.S.C. 154(b) by 1098 days.

(21) Appl. No.: 11/816,166

(22) PCT Filed: Jan. 19, 2006

(86) PCT No.: PCT/JP2006/300767
§ 371 (c)(1),
(2), (4) Date: Aug. 13, 2007

(87) PCT Pub. No.: WO2006/087883
PCT Pub. Date: Aug. 24, 2006

(65) Prior Publication Data
US 2009/0052392 A1    Feb. 26, 2009

(30) Foreign Application Priority Data
Feb. 15, 2005    (JP) .................................. 2005-037812

(51) Int. Cl.
*H04W 36/02*    (2009.01)

(52) U.S. Cl.
USPC ............ 370/331; 370/328; 455/524; 455/525

(58) Field of Classification Search
USPC ........... 370/331, 328, 524–525; 455/524–525
See application file for complete search history.

(56) References Cited

U.S. PATENT DOCUMENTS 5,901,226 A * 5/1999 Brenner et al. ............... 455/437
6,721,564 B1 * 4/2004 Kobayashi .................... 455/436
(Continued)

FOREIGN PATENT DOCUMENTS

EP    1549097 A1 *    6/2005    ............. H04Q 7/38
JP    10-215475 A      8/1998
(Continued)

OTHER PUBLICATIONS

Chinese Office Action dated Jan. 8, 2010, issued in corresponding Chinese Patent Application No. 2006/800050409.

*Primary Examiner* — Lewis West
*Assistant Examiner* — Qun Shen
(74) *Attorney, Agent, or Firm* — Dickinson Wright PLLC

(57) ABSTRACT

A base station, a mobile station and a retransmission control method for enabling communication to be more efficiently performed. In a communication system comprising a base station (100) and a mobile station (200), a time period required for the retransmission of a transport packet to complete is determined, and a retransmission control is performed, based on the required time period, to change the order of executing the retransmission of the transport packet and a handover. In this way, when it is estimated that the retransmission will complete soon, the retransmission is caused to complete in a handover source system, thereby avoiding waste of communication resources used in the preceding transmission and retransmission processes. When it is estimated that the retransmission will continue for a while, the communication resources used in the preceding transmission and retransmission processes are wasted, but a more appropriate MCS can be assigned, in a handover destination system, so as to perform a retransmission, thereby enabling communication to be efficiently performed.

5 Claims, 10 Drawing Sheets

(56) References Cited

U.S. PATENT DOCUMENTS

| | | | |
|---|---|---|---|
| 6,920,325 B2* | 7/2005 | Oobayashi | 455/436 |
| 6,934,545 B2* | 8/2005 | Sugimoto | 455/436 |
| 7,293,107 B1* | 11/2007 | Hanson et al. | 709/245 |
| 2002/0045449 A1* | 4/2002 | Oobayashi | 455/436 |
| 2002/0181437 A1* | 12/2002 | Ohkubo et al. | 370/349 |
| 2003/0108013 A1* | 6/2003 | Hwang et al. | 370/335 |
| 2003/0135784 A1* | 7/2003 | Yamaguchi et al. | 714/18 |
| 2004/0038680 A1* | 2/2004 | Ishiguro et al. | 455/436 |
| 2004/0218561 A1* | 11/2004 | Obuchi et al. | 370/328 |
| 2005/0032522 A1* | 2/2005 | Soong et al. | 455/450 |
| 2005/0043051 A1* | 2/2005 | Takano et al. | 455/522 |
| 2005/0111389 A1* | 5/2005 | Dick et al. | 370/278 |
| 2005/0210355 A1* | 9/2005 | Itoh et al. | 714/748 |
| 2005/0259663 A1 | 11/2005 | Ode | |
| 2006/0215592 A1* | 9/2006 | Tomoe et al. | 370/315 |
| 2010/0142485 A1* | 6/2010 | Lee et al. | 370/331 |

FOREIGN PATENT DOCUMENTS

| | | |
|---|---|---|
| JP | 2000-69557 A2 | 3/2000 |
| JP | 2004-72513 A | 3/2004 |
| JP | 2004-80259 A2 | 3/2004 |
| JP | 2004-80640 A | 3/2004 |
| WO | 03049484 A1 | 6/2003 |
| WO | 2004/075589 A1 | 9/2004 |

* cited by examiner

RETRANSMISSION CONTROL METHOD, BASE STATION AND MOBILE STATION

TECHNICAL FIELD

The present invention particularly relates to a retransmission control method, a base station and a mobile station that employ automated repeat requests.

BACKGROUND ART

One error control technology is called automatic repeat request (hereinafter "ARQ"). In ARQ, a transmitting side and a receiving side are linked by a bi-directional channel. Initially, the transmitting side sends packets that include code words generated by applying error detection encoding to information bits, and the receiving side applies error detection. If the receiving side does not detect an error in the received data, the receiving side returns a reception acknowledgement signal (called positive acknowledgment or "ACK"; hereinafter referred to as "ACK") to the transmitting side to indicate that the reception is correctly performed. If the receiving side detects an error in the received data, the receiving side returns a retransmission request signal (called negative acknowledgment or "NACK"; hereinafter referred to as "NACK") to the transmitting side. The transmitting side retransmits the same packets when the NACK signal is received. The transmitting side repeats retransmitting the same packets until the ACK signal received. ARQ makes it possible to implement high-quality data transmission.

If a handover is started in midstream of error control by the ARQ, the packets to be resent are destroyed at the handover source and the same packets are transmitted at the handover destination, so there is the problem of reduced throughput.

In view of the above problem, patent document 1 proposes a communication system that prevents a drop in throughput by discarding and retransmitting retransmission packets when there is a handover by reducing the number of retransmission packets, by limiting the number of processes for retransmission if there is the possibility of a handover, considering the possibility of a handover.

Patent Document 1: Japanese Patent Application Laid-Open No. 2004-80640

DISCLOSURE OF THE INVENTION

Problems to be Solved by the Invention

However, although throughput is improved to some degree, conventional communication systems provide control by using an unstable element called a possibility of a handover, so it is impossible to surely eliminate the waste associated with the discarding and retransmission of retransmission data. Therefore, it is not possible to say that adequately efficient communications is implemented.

In view of the above, it is an object of the present invention to provide a retransmission control method, a base station and a mobile station that enable more efficient communication.

Means of Solving the Problem

The retransmission control method of the present invention provides a step of acquiring the time required to complete a retransmission of a retransmission packet, and a step of changing the order of the execution of the retransmission of transmission packets and the handover based on the required time.

Advantageous Effect of the Invention

The present invention provides a retransmission control method, a base station, and a mobile station that enable more efficient communication.

BEST MODE FOR CARRYING OUT THE INVENTION

Preferred embodiments of the present invention will now be explained in detail with reference to the accompanying drawings. Note that in each of the embodiments, the same reference symbols are applied to the same components, thus duplicated explanations thereof will be omitted.

Each embodiment relates to handovers between systems in a communication system in which ARQ is applied. In the embodiments, handovers between systems include handovers between systems with mutually different wireless access schemes, handovers between base stations covering different cells, and handovers between sectors within the same cell. Although this specification uses handovers between sectors within the same cell for explanation, the explanation should not be construed to be a limitation.

Embodiment 1

Figure 1:
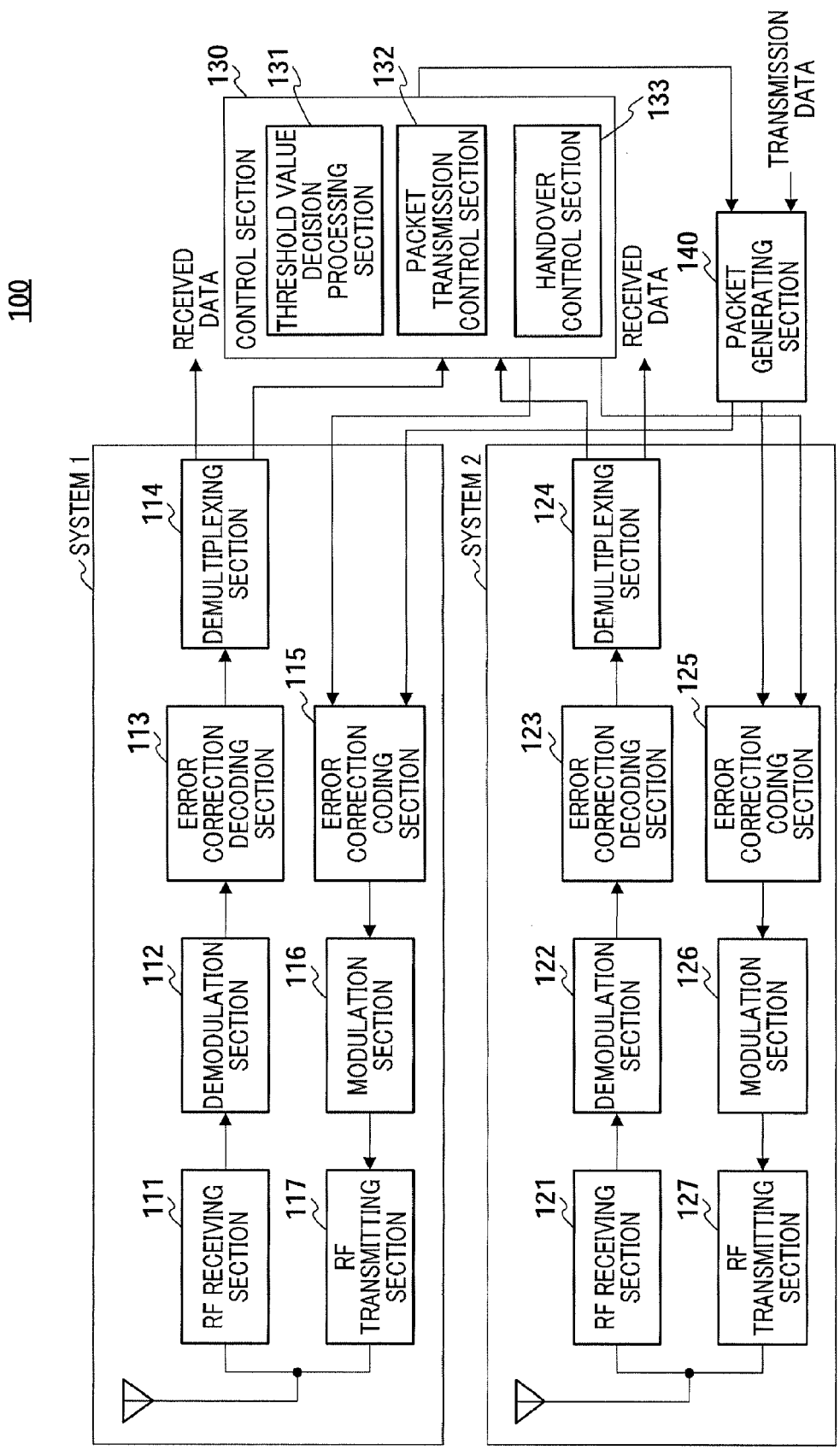
FIG. 1 is a block diagram showing a configuration of a base station device according to a first embodiment of the present invention.

As shown in FIG. 1, the base station 100 of the first embodiment has: an RF receiving section 111; a demodulation section 112; an error correction decoding section 113; a demultiplexing section 114; an error correction coding section 115; a modulation section 116; an RF transmitting section 117; an RF receiving section 121; a demodulation section 122; an error correction decoding section 123; a demultiplexing section 124; an error correction coding section 125; a modulation section 126; a RF transmitting section 127; a control section 130; and a packet generating section 140. The control section 130 has a threshold value decision processing section 131; a packet transmission control section 132; and a handover control section 133.

These components can be classified into, system 1 that is provided with the RF receiving section 111; the demodulation section 112; the error correction decoding section 113; the demultiplexing section 114; the error correction coding section 115; the modulation section 116; and the RF transmitting section 117, and system 2 that is provided with the RF receiving section 121; the demodulation section 122; the error correction decoding section 123; the demultiplexing section 124; the error correction coding section 125; the modulation section 126; and the RF transmitting section 127. The control section 130 and packet generating section 140 are shared by both system 1 and system 2. System 1 and system 2 cover different sectors. Note that to simplify the explanation, two systems will be used. However, it is acceptable for more than two systems to be adopted.

Received signals received from system 1 undergo predetermined processes at the RF receiving section 111, demodulation section 112, and error correction decoding section 113, and are then sent to the demultiplexing section 114.

The demultiplexing section 114 demultiplexes the types of information included in the received signals after error correction, and sorts that to functioning parts to which they should be outputted.

The error correction coding section 115 applies an error correction encoding process on output information from the control section 130 and packet generating section 140, described below. After the error correction encoding process, signals undergo predetermined processes at the modulation section 116 and the RF transmitting section 117, and then are transmitted via an antenna. Note that system 2 is composed of substantially the same configuration as system 1.

The control section 130 receives as input ACK/NACK information and handover request information from the demultiplexing section demultiplexing section 114, performs threshold value decision processing using information that relates to a predetermined number of retransmissions and that can be used as an index (an index for the time required to complete retransmission) that corresponds to the time required to complete a retransmission process to control the order of execution of the retransmission process according to the determination results and the handover process.

When ACK/NACK information that indicates NACK (hereinafter referred to simply as "NACK") is inputted to the control section 130, the threshold value decision processing section 131 finds a normalized number of retransmissions with the maximum number of retransmissions preset as information relating to the predetermined number of retransmissions by the system, in other words, the threshold value decision processing section 131 finds the value of the number of retransmissions of packets that correspond to the input ACK/NACK information divided by the maximum number of retransmissions. The found value and a predetermined threshold value are compared to generate comparison result information.

The packet transmission control section 132 outputs the packet output command signal to the packet generating section 140, and controls the output of packets (new transmission packets and retransmission packets) that correspond to the packet output command signal retained in memory comprised by the packet generating section 140. Note that the packet output command signal for retransmission packets is output when the packet transmission control section 132 receives NACK as the retransmission request.

The handover control section 133 sends packet transmission destination information in response to handover request information, and switches the transmission destination of the output packet coming from the packet generating section 140 between system 1 and system 2. In other words, the handover control section 133 controls the handover. When performing the handover, the handover control section 133 sends to the handover source (originating) system the handover report information to report the handover (including identification information of the handover destination system) to the packet receiving side.

To explain in more detail, when the handover request information is inputted to the control section 130, the handover control section 133 and the packet transmission control section 132 cooperate to control the order of execution of the retransmission process and the handover process according to the comparison result report generated at the threshold value decision processing section 131. Specifically, if the comparison result information indicates that the value of the number of retransmissions divided by the maximum transmission count is greater than the predetermined threshold value, the retransmission process is executed first and the handover is executed later. In other words, when it is likely that completion of the retransmission process will not take much time, the retransmission process is completed by the system before the handover (handover source). Note that completion of the retransmission process can be verified when ACK/NACK information that indicates ACK (hereinafter referred to as "ACK") is returned from the receiving side of the retransmission packet.

If the comparison result information indicates that the value of the number of retransmissions divided by the maximum transmission count is equal to or less than a predetermined threshold value, the handover is executed first, and the retransmission process is executed later. In other words, when it is likely that completion of the retransmission process will take quite a lot of time, the retransmission process is completed by the system after the handover (handover destination). The process explained here performed in the control section 130 is called the "threshold value decision process."

The packet generating section 140 generates packets from the input transmission data and retains them in its memory. The packet generating section 140 transmits to the system that corresponds to the packet transmission destination information packets that correspond to the packet output command signal from the control section 130.

Figure 2:
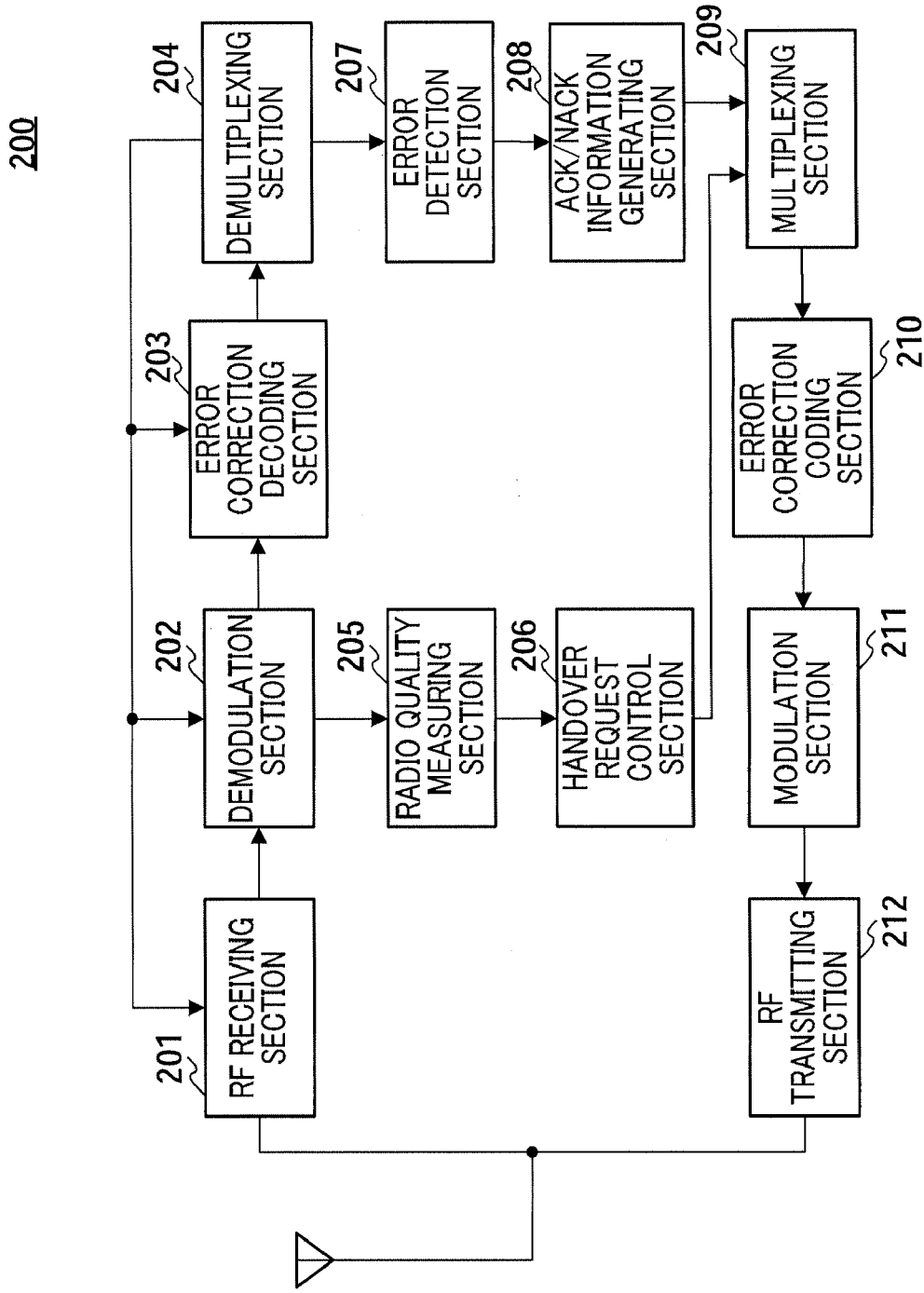
FIG. 2 is a block diagram showing a configuration of a mobile station according to the first embodiment.

As shown in FIG. 2, the mobile station 200 of the first embodiment has: an RF receiving section 201; a demodulation section 202; an error correction decoding section 203; a demultiplexing section 204; a radio quality measuring section 205; a handover request control section 206; an error detection section 207; an ACK/NACK information generating section 208; a multiplexing section 209; an error correction coding section 210; a modulation section 211; and an RF transmitting section 212.

The mobile station 200 receives signals transmitted from the base station 100 and applies predetermined processes at the RF receiving section 201, the demodulation section 202, and the error correction decoding section 203. Each component switches from the setting state corresponding to the handover source system of the current communicating party, to a setting state corresponding to the handover destination system, based on the handover report information inputted from the demultiplexing section 204.

The demultiplexing section 204 demultiplexes the types of information included in the received signals after error correction, and sorts the information to functioning parts to which they should be outputted. Specifically, the handover report information is outputted to the RF receiving section 201, the demodulation section 202, and the error correction decoding section 203.

Also, the radio quality measuring section 205 uses output signals from the demodulation section 202 to measure radio quality with each system of the base station 100. As a signal used to measure radio quality, for example, the pilot signal transmitted from each system of the base station 100 can be used.

The handover request control section 206 compares the radio quality information measured by the radio quality measuring section 205. When the radio quality with the handover destination system is better than with the handover source system, the handover request information is outputted to the multiplexing section 209.

The error detection section 207 performs the error detection process on received data received from the demultiplexing section 204, and outputs the error detection results to the ACK/NACK signal generating section 208.

The ACK/NACK information generating section 208 generates ACK or NACK, according to the error detection results and outputs the ACK or NACK to the multiplexing section 209.

The multiplexing section 209 receives as input handover request information and ACK/NACK information and outputs these information to the error correction coding section 210.

Output signals from the multiplexing section 209 undergo predetermined processes at the error correction coding section 210, the modulation section 211, and the RF transmitting section 212, and then are transmitted via an antenna to the base station 100.

Figure 3:
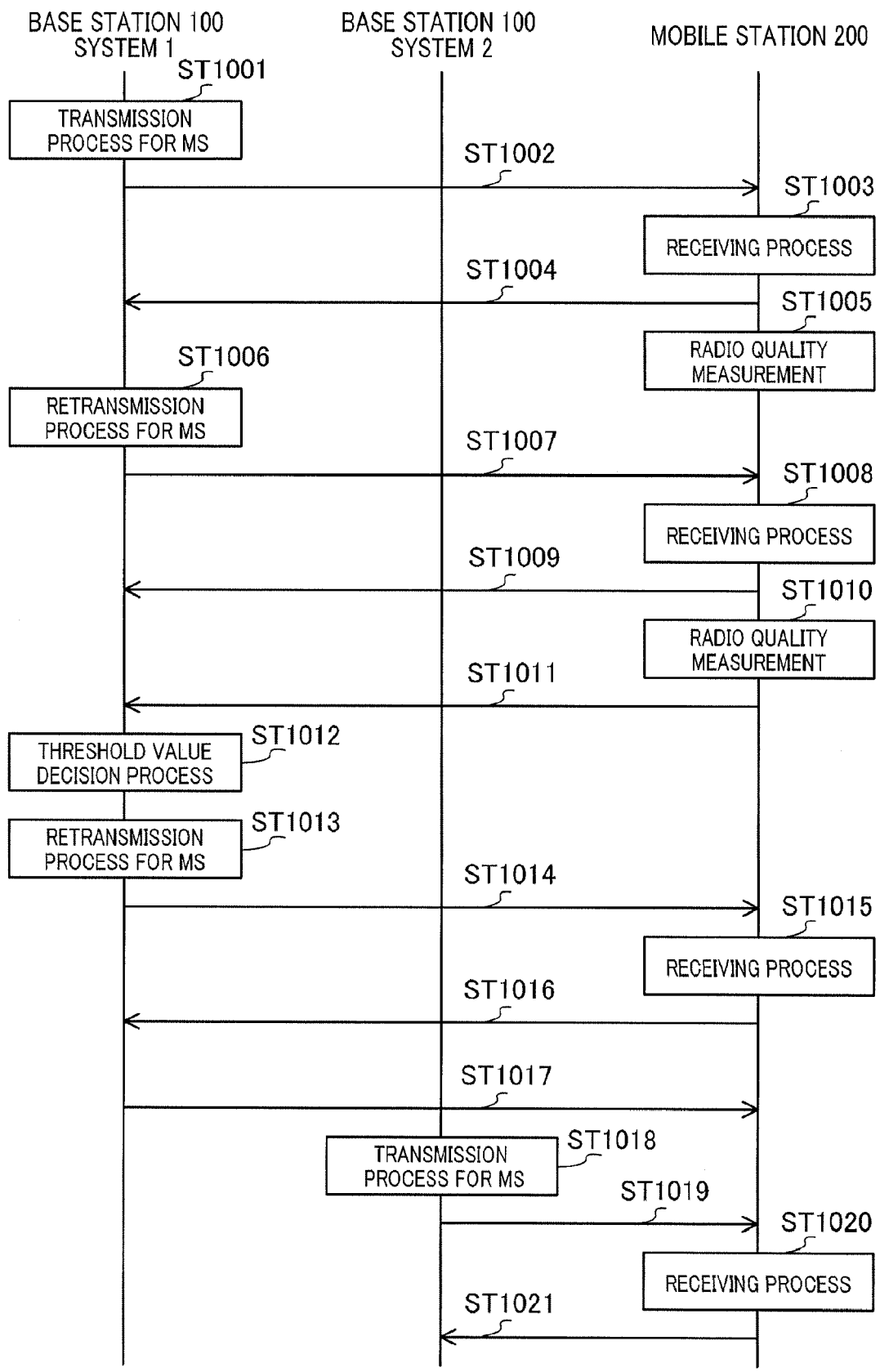
FIG. 3 is a drawing to explain the operations of a wireless communication system composed of the base station of FIG. 1, and the mobile station of FIG. 2.

Next, operations of the wireless control system provided with the base station 100 having the configuration described above, and the mobile station 200 will now be explained with reference to FIG. 3. The explanation will focus on handovers between systems, namely from system 1 to system 2.

At step ST1001 and step ST1002, the base station 100 system 1 performs the packet transmission process to mobile station 200.

At step ST1003, the mobile station 200 performs the packet receiving process. Now, assume that at the error detection section 207, an error is detected in the packets.

When this happens, at step ST1004, the mobile station 200 generates NACK at the ACK/NACK information generating section 208 and transmits that to the base station 100.

Also, at step ST1005, the base station 100 uses pilot signals transmitted from each system of the base station 100 to measure radio quality. However, radio quality measurement is constantly performed. Here, assume that, because the reception quality of system 1 is better than the reception quality of system 2, it is determined not to make a request at the handover request control section 206.

At steps ST1006 and ST1007, system 1 of the base station 100 that received the NACK performs the retransmission process of packets in response to the NACK because the system 1 has not received the handover request signal.

At step ST1008, the mobile station 200 performs the receiving process for retransmission packets. Here, assume that an error is also detected in these packets.

At step ST1009, the mobile station 200 transmits NACK again to the base station 100.

If, at step ST1010, system 2 has better measurement results of the reception quality than system 1, the mobile station 200 transmits the handover request information to system 1 of the base station 100 at step ST1011.

At step ST1012, the base station 100 performs the threshold decision process upon receiving the handover request information. If the value for the number of retransmissions divided by the maximum number of retransmissions is greater than a predetermined threshold value, it is expected that the completion of the retransmission time will not take much time. Therefore, the retransmission process is completed at the system of before the handover (handover source). The case will be described later with reference to FIG. 4 where the value of the number of retransmissions divided by the maximum transmission count is equal to or less than a predetermined threshold value.

At steps ST1013 and ST1014, the base station 100 performs the retransmission process for packets at system 1 of the handover source.

At step ST1015, the mobile station 200 performs the receiving process for retransmission packets. Here, assume that an error is not detected in the packets.

In such case, at step ST1016, the mobile station 200 transmits ACK to the base station 100 to notify that the reception was successful.

When ACK is received from the mobile station 200, the base station 100 learns that the retransmission process has been completed.

The handover process to system 2 is performed in addition to the base station 100 transmitting (step ST1017) the handover report information to the mobile station 200.

Also, after the handover, a new packet is transmitted (steps ST1018, and ST1019).

At step ST1020, the mobile station 200 performs the receiving process for that packet.

At step ST1021, the mobile station 200 transmits ACK to the base station 100 because no error was detected in the received packets. Note that when the number of retransmissions reaches the maximum number of retransmissions, in other words when the value of the number of retransmissions divided by the maximum number of retransmissions is 1, the handover is executed and then the retransmission is executed at the handover destination system.

Figure 4:
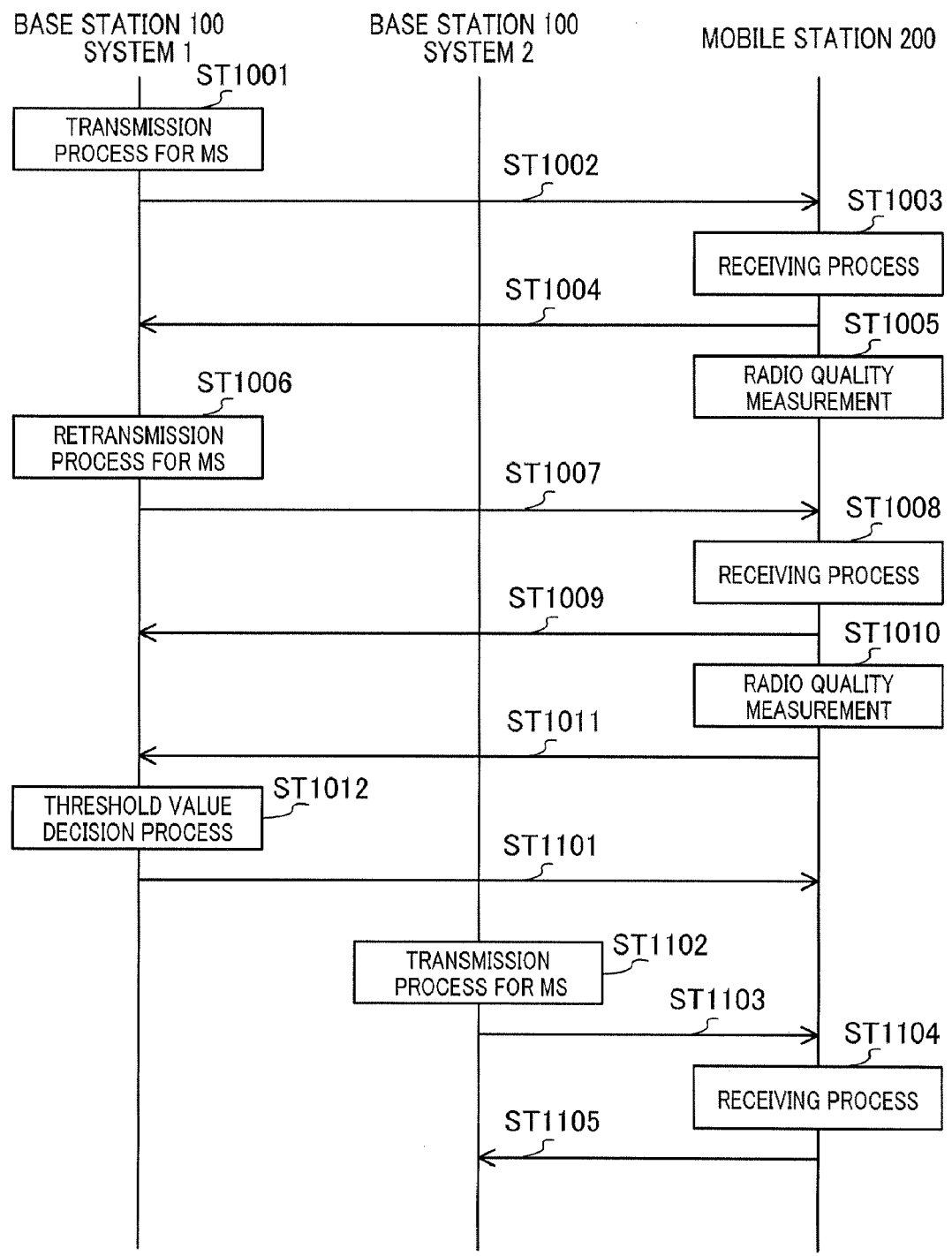
FIG. 4 is another drawing to explain the operations of the wireless communication system composed of the base station of FIG. 1, and the mobile station of FIG. 2.

As shown in FIG. 4, at the threshold decision process of step ST1012, if the value of the number of retransmissions divided by the maximum number of retransmissions is indicated to be equal to or less than a predetermined threshold value, the base station 100 performs the handover process to system 2 in addition to transmitting the handover report information (step ST1101) to the mobile station 200 before performing the retransmission process.

At steps ST1102 and ST1103, system 2 of the base station 100 performs the transmission process (equal to the retransmission process when considering it is before the handover) for packets that were not correctly transmitted to the mobile station 200, with system 1 before the handover.

At step ST1104, the mobile station 200 performs the receiving process for those packets.

At step ST1106, the mobile station 200 transmits ACK to the base station 100 because no errors were detected in the received packets.

Note that in the explanation above, a value of the number of retransmissions divided by the maximum number of retransmissions was used as an index for the time required to complete the retransmission, but this is not to be construed to be a limitation. It is also acceptable to use the number of retransmissions itself. Also, it is acceptable to find the average number of retransmissions until the packets can be correctly transmitted for each MCS (Modulation Coding Scheme), CQI (Channel Quality Indicator) or reception quality, and use the value (the number of retransmissions normalized according to the average number of retransmissions) of the number of retransmissions divided by the average number of retransmissions that corresponds to the current MCS, CQI or reception quality as an index for the time required to complete the retransmission.

Note that the explanation above used an example of handovers between sectors, but the control above can also be applied to handovers between base stations as described above. At this time, the base station 100 described above is composed of two base stations and a base station control apparatus. Also, for example, system 1 above is provided one base station, and system 2 is provided the other base station; the control section is provided in the base station control apparatus.

Also note that the explanation above used an example of downlink packet communication for retransmission control, but the retransmission control can also be applied to uplink communication.

Thus, according to the first embodiment, in a communication system composed of a base station 100 and a mobile station 200, the time required until the completion of retransmission of transmission packets is acquired, and, based on that required time, retransmission control is performed to change the order of the execution of the transmission packet retransmission and handovers.

Also, regarding the change in the order of execution, retransmission control is performed such that the retransmission of the transmission packets is completed in the handover source system and then the handover is executed when the required time is equal to or greater than a predetermined threshold value, or the retransmission of the transmission packets in the handover destination system is executed when the required time is less than a predetermined threshold value.

By doing so, when it is likely that retransmission will be completed soon, the communication resources used in the transmission and retransmission processes until then will not be wasted by completing the retransmission by the handover source system. When it is likely that retransmission will continue for an extended time, the handover destination system can transmit by assigning more appropriate MCS to enable efficient communication, although communication resources will be wasted by transmission and retransmission up to that point.

Also, according to the first embodiment, the packet generating section 140 that generates transmission packets and retains the transmission packets, and the control section 130 that controls the retransmission of the transmission packets based on the retransmission request from the mobile station 200 and controls the handovers between systems based on handover requests from the mobile station 200 are provided on the base station 100; the control section 130 changes the order of execution of retransmission of the transmission packets and the handover based on the time required until the completion of the retransmission of the transmission packets.

By doing so, when it is likely that retransmission will be completed soon, the communication resources used in the transmission and retransmission processes until then will not be wasted by completing the retransmission by the handover source system. When it is likely that retransmission will continue for an extended time, the handover destination system can transmit by assigning more appropriate MCS to implement a mobile station that is capable of efficient communication, although communication resources will be wasted by transmission and retransmission up to that point.

Also, by using the number of retransmissions as an index for the time required to complete retransmission corresponding to the required time, the decision process can be simplified. Also, by using the number of retransmissions normalized by the maximum number of retransmissions as the index for the time required to complete retransmission that corresponding to the required time, it is possible to learn using a standardized method the status of advancement in the retransmission process even in communications mixed with a different maximum number of retransmissions are set. Also, by using a value (the number of retransmissions normalized according to the average number of retransmissions) of the number of retransmissions divided by the average number of retransmissions corresponding to the current MCS, CQI or reception quality as an index for the time required to complete retransmission, it is possible to more accurately learn the status of advancement in the retransmission process.

Embodiment 2

In the first embodiment, the base station 100 performs a control to change the order of execution of the packet retransmission process and the handover process, but, in the second embodiment, the mobile station changes and controls the order of execution of retransmission process and handover process by controlling the order of execution of the handover request transmission and retransmission request transmission at the mobile station.

Figure 5:
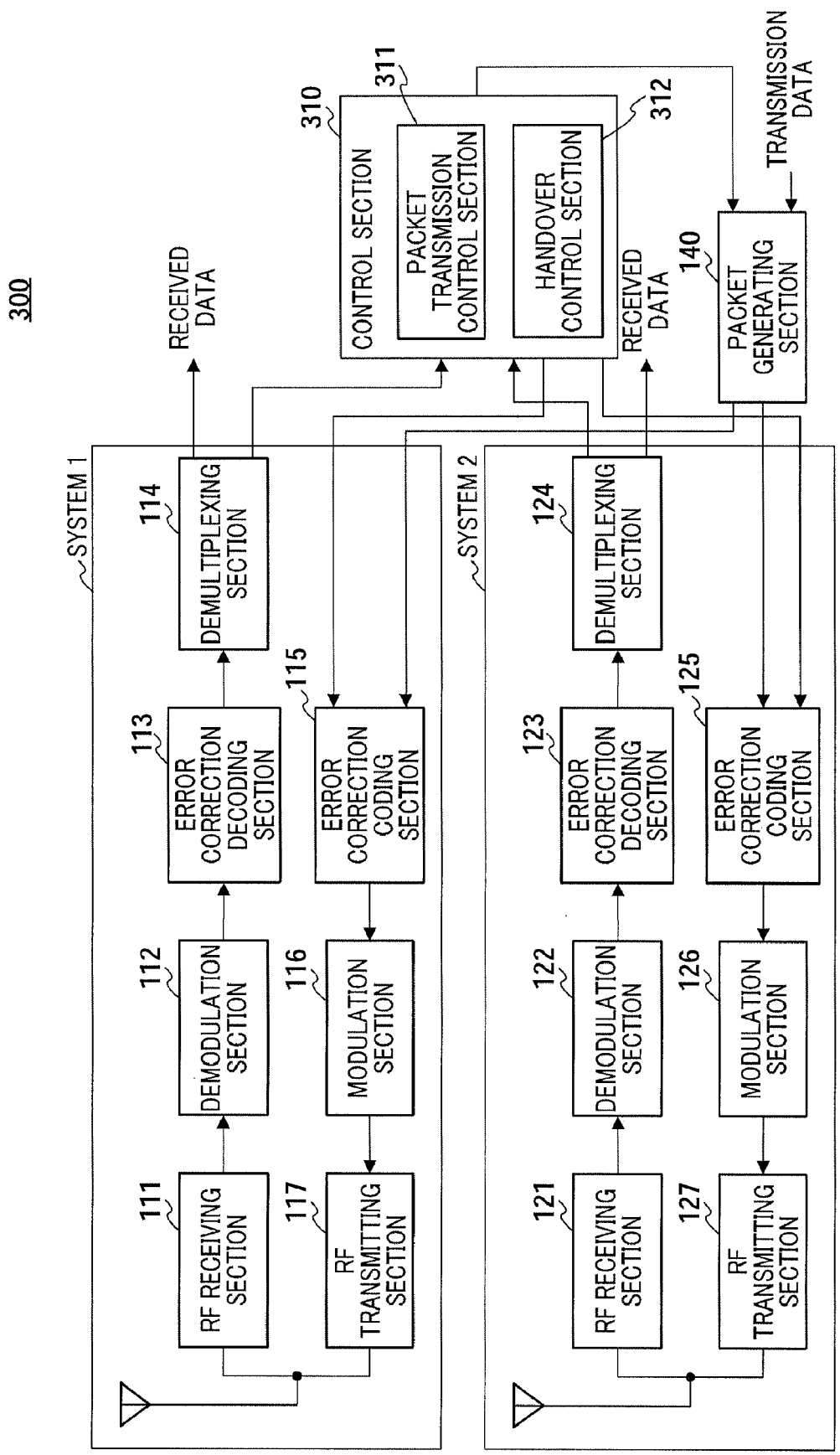
FIG. 5 is a block diagram showing a configuration of the base station in a second embodiment.
Figure 6:
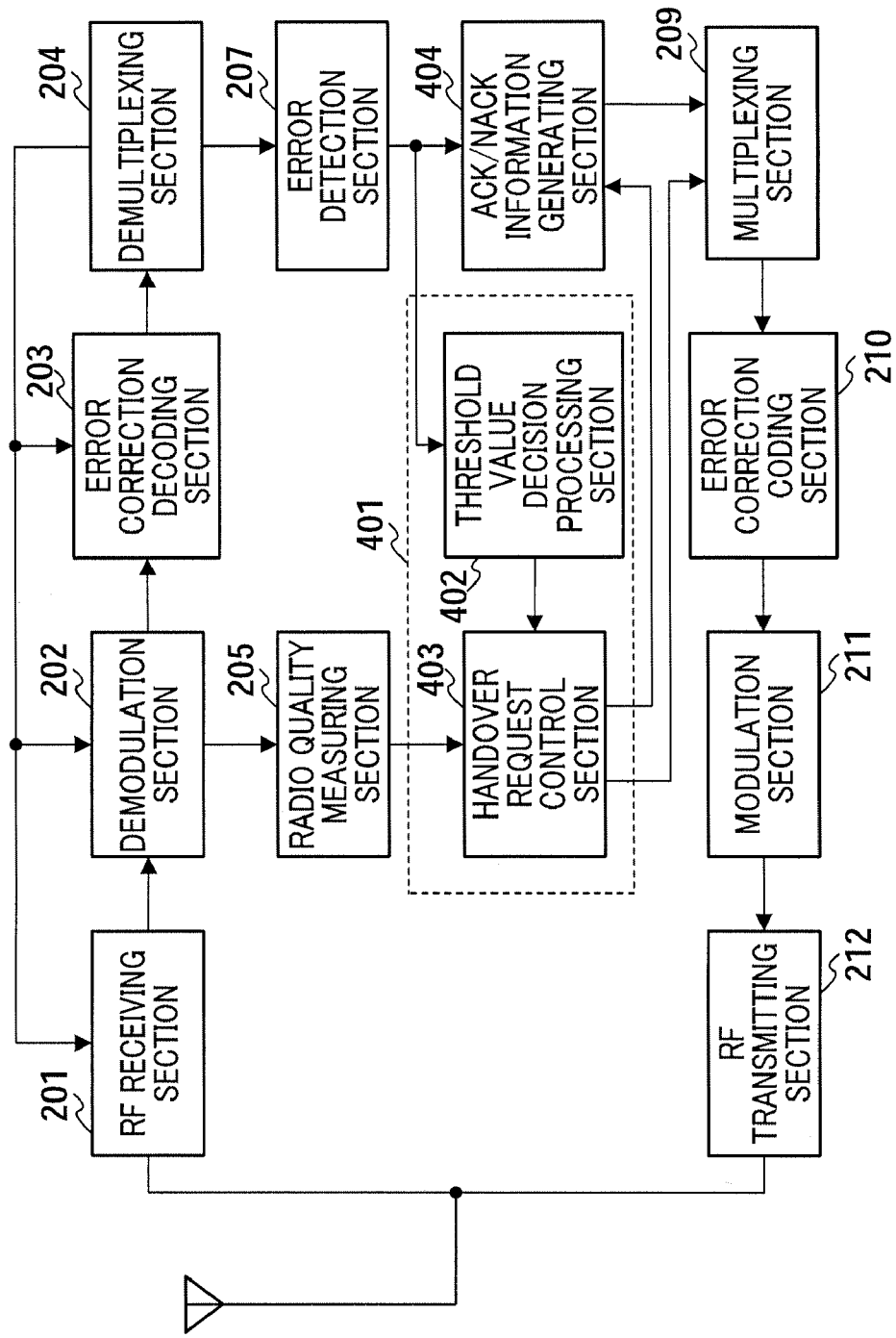
FIG. 6 is a block diagram showing a configuration of a mobile station according to the second embodiment.

As shown in FIG. 5, the base station 300 has the control section 310. The control section 310 has a packet transmission control section 311; and a handover control section 312.

The packet transmission control section 311 outputs a packet output command signal to the packet generating section 140, and controls the output of packets (new transmission packets and retransmission packets) that correspond to the packet output command signal retained in memory comprised by the packet generating section 140. Note that the packet output command signal for retransmission packets is output when the packet transmission control section 311 receives NACK as the retransmission request.

The handover control section 312 sends packet transmission destination information in response to the handover request information, and switches the transmission destination of the output packet coming from the packet generating section 140 between system 1 and system 2. In other words, the handover control section 312 controls the handover. When performing the handover, the handover control section 312 sends to the system before the handover (the source) the handover report information reporting the handover (including identification information of the handover destination system) to the packet receiving side.

The mobile station 400 provides a control section 410 that has a threshold value decision processing section 402 and a handover request control section 403; and an ACK/NACK information generating section 404.

When there is an error in the packets transmitted from the base station 300 as a result of the error detection of the error detection section 207, the threshold value decision processing section 402 finds the number of retransmissions normalized by the maximum number of retransmissions preset by the system as information relating to a predetermined number of retransmissions. In other words, the threshold value decision processing section 402 finds the value of the number of retransmissions of the packets detected to have an error by the error detection section 207 divided by the maximum number of retransmissions. The calculated value and a predetermined threshold value are compared to generate comparison result information and this information is outputted to the handover request control section 403. In other words, when there is an error in a received packet and it is necessary to perform a retransmission request, the information relating to the predetermined number of retransmissions is inputted to the handover request control section 403.

The handover request control section 403 compares the radio quality information measured by the radio quality measuring section 205. When the radio quality with the handover destination system is better than with the handover source system, the handover request control section 403 generates the handover request information (when there is the need for a handover). Also, the handover request control section 403 controls the order of the handover request information and the output of NACK from the ACK/NACK information generating section 404, in other words, the output of the retransmission request.

Specifically, the handover request control section 403 outputs the retransmission request output command signal that commands the ACK/NACK information generating section 404 to transmit NACK as the retransmission request when the value indicating the output information of the handover request control section 403 is equal to or greater than a predetermined threshold value and there is a need for a handover and the generated handover request information is retained. Also, when the packets transmitted from the base station 300 in response to the retransmission request have been correctly received, the handover request control section 403 outputs the handover request information to the multiplexing section 209. Note that when the maximum number of retransmissions is reached, the handover request control section 403 outputs the handover request information to the multiplexing section 209.

Also, the handover request control section 403 outputs the retransmission request information to the multiplexing section 209 when the value indicating the output information of the threshold value decision processing section 402 is below a threshold value, there is a need for the handover, and the generated handover request information is retained.

In other words, the handover request control section 403 performs a control to complete the retransmission process before transmitting the handover request information to the base station 300 when it is likely that completion of the retransmission process will not take much time. The handover request control section 403 performs a control to initially transmit the handover request information and then execute the handover process when it is likely that completion of the retransmission process will take considerable time.

Figure 7:
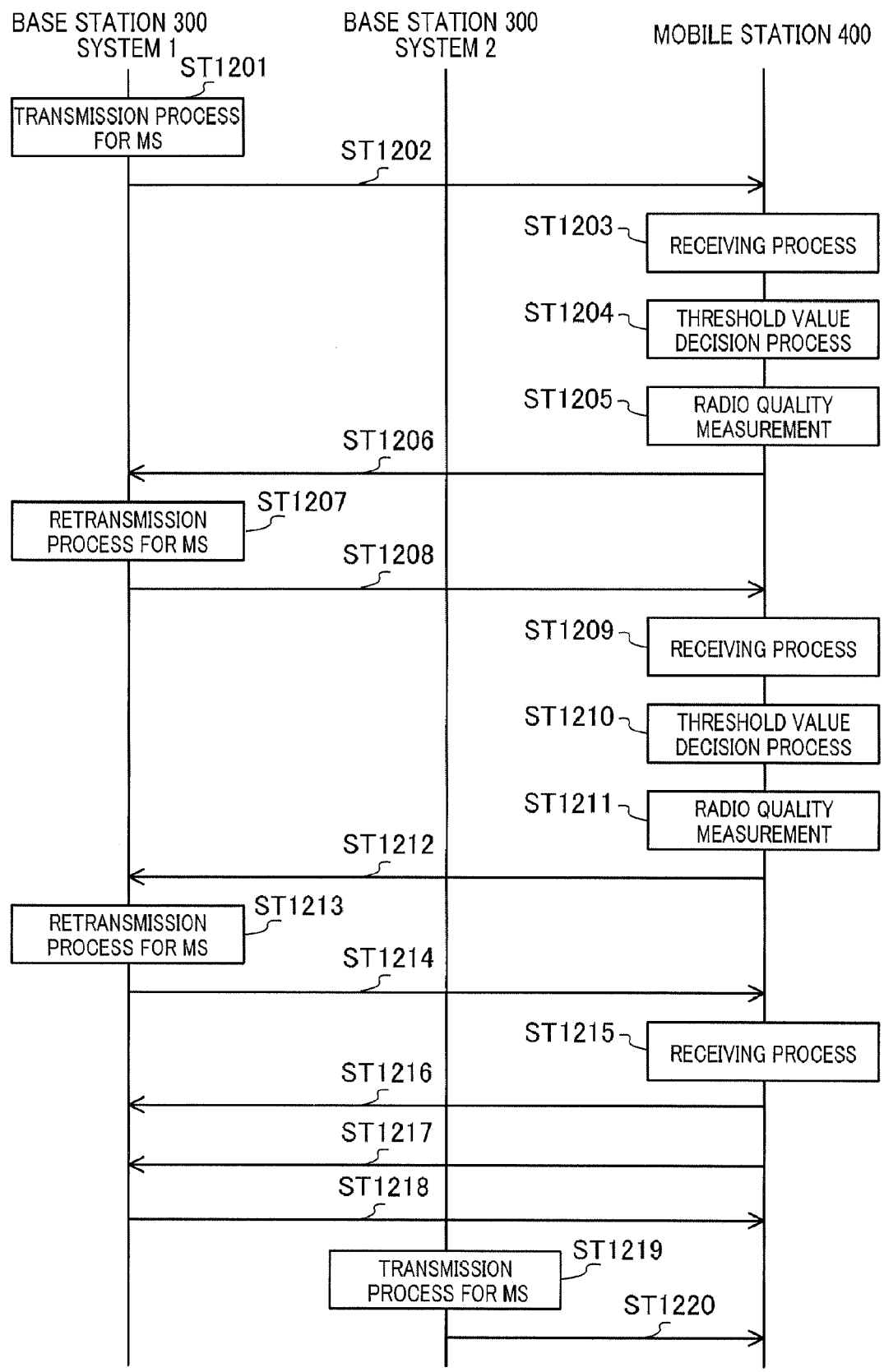
FIG. 7 is a drawing to explain the operations of the wireless communication system composed of the base station of FIG. 5, and the mobile station of FIG. 6.

Next, operations of the wireless control system provided with the base station 300 having the configuration described above, and the mobile station 400 will now be explained with reference to FIG. 7. The explanation will focus on handovers between systems, namely from system 1 to system 2.

At step ST1201 and step ST1202, the base station 300 system 1 performs the packet transmission process to mobile station 400.

At step ST1203, the mobile station 400 performs the packet receiving process. Assume that, at the error detection section 207, an error is detected in the packets.

At step ST1204, the mobile station 400 performs the threshold decision process.

Also, at step ST1205, the mobile station 400 measures the radio quality using pilot signals transmitted from each system of the base station 300. However, radio quality measurement is constantly performed. Here, assume that, because the reception quality of system 1 is better than the reception quality of system 2, it is determined not to request a handover at the handover request control section 403.

Also, because there is no need for a handover at this time, the mobile station 400 sends NACK to the base station 300 at step ST1206 regardless of the results of the threshold value decision process.

At step ST1207 and step ST1208, the base station 300 system 1 performs the packet transmission process in response to the NACK.

At step ST1209, the mobile station 400 performs the packet receiving process. Assume that, at the error detection section 207, an error is detected in the packets.

At step ST1210, the mobile station 400 performs the threshold decision process. Assume that, if the value for the number of retransmissions divided by the maximum number of retransmissions is greater than a predetermined threshold value at that time, it is expected that the completion of the retransmission time will not take much time. Note that the case will be described later with reference to FIG. 8 where it is indicated that the value of the number of retransmissions divided by the maximum transmission count is equal to or less than a predetermined threshold value.

Also, at step ST1211, the mobile station 400 measures the radio quality using pilot signals transmitted from each system of the base station 300. Here, assume that, because the reception quality of system 2 is better than the reception quality of system 1, it is determined to request a handover at the handover request control section 403.

Also, because there is a need for a handover at this time and the value indicating the output information of the threshold value decision processing section 402 is equal to or greater than a predetermined threshold value, the mobile station 400 transmits NACK to system 1 of the base station 300 (Step ST1212) without outputting the handover request information.

At steps ST1213 and ST1214, the base station 300 performs the retransmission process for packets at system 1.

At step ST1215, the mobile station 400 performs the receiving process for retransmission packets. Assume that, here, an error was not detected in the packets.

In such case, at step ST1216, the mobile station 400 transmits ACK to the base station 300 to notify that the reception was successful.

Also, at step ST1217, the handover request information is transmitted to system 1 of the base station 300 because the handover request information is generated at ST1211.

The handover process to system 2 is performed in addition to the base station 300 transmitting (step ST1218) the handover report information to the mobile station 400.

Also, after the handover, the transmission process for a new packet is performed (steps ST1219 and ST1220). Note that when the number of retransmissions reaches the maximum number of retransmissions, in other words when the value of the number of retransmissions divided by the maximum number of retransmissions is 1, the handover is executed and then the retransmission is executed at the handover destination system.

Figure 8:
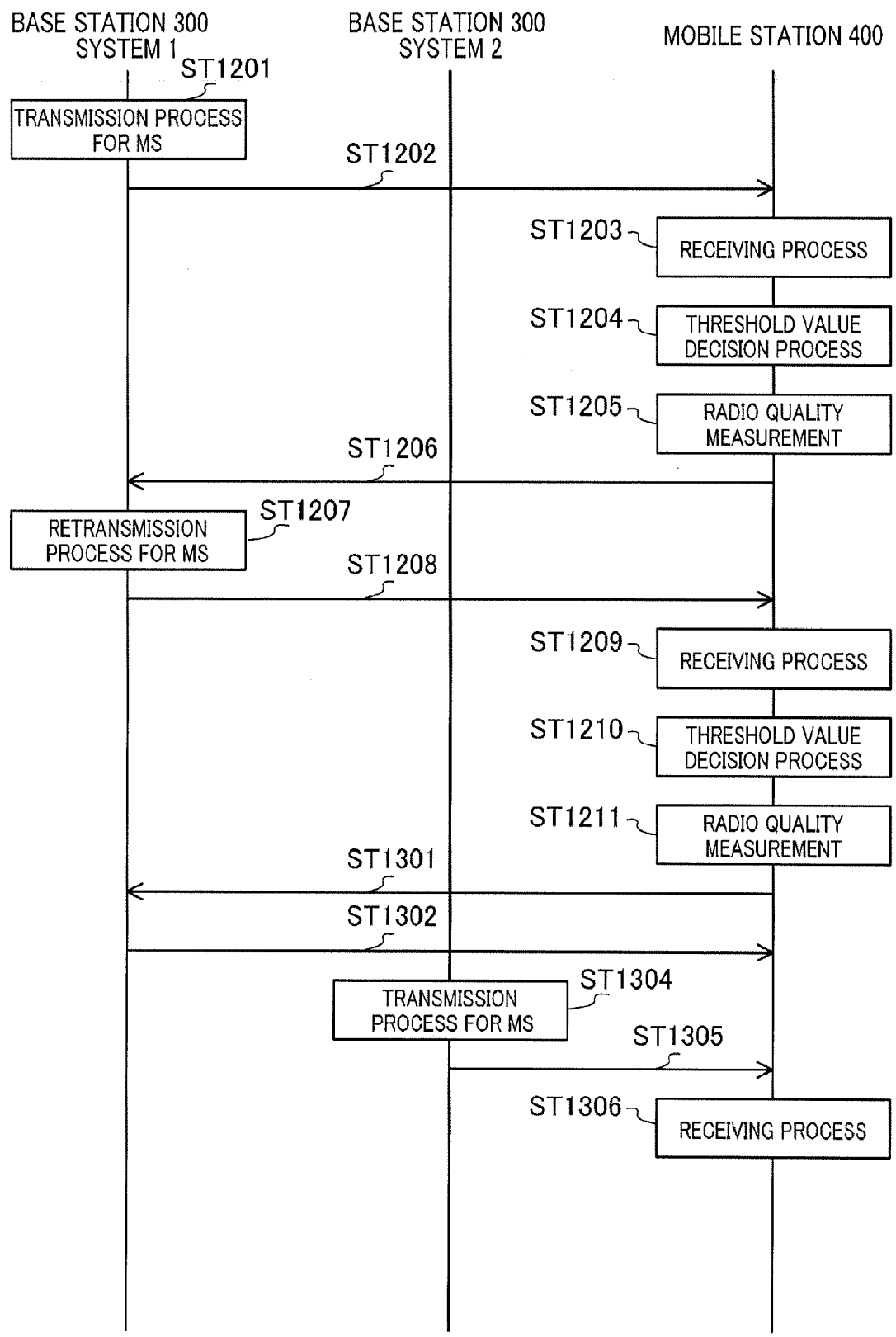
FIG. 8 is another drawing to explain the operations of the wireless communication system composed of the base station of FIG. 5, and the mobile station of FIG. 6.

As shown in FIG. 8, at the threshold decision process of step ST1210, if the value of the number of retransmissions divided by the maximum number of retransmissions is indicated to be equal to or lower than a predetermined threshold value, the base station 300 transmits the handover request information (step ST1301) to the mobile station 400 before performing the retransmission process.

Upon receiving the handover request information, the base station 300 performs the handover process to system 2 in addition to transmitting (step ST1302) the handover report information to the mobile station 400.

At steps ST1304 and ST1305, system 2 of the base station 300 performs the transmission process (equal to the retransmission process when considering it is before the handover) for packets that were not correctly transmitted to the mobile station 400, at system 1 before the handover.

At step ST1306, the mobile station 400 performs the receiving process for that packet.

Note that in the explanation above, the value of the number of retransmissions divided by the maximum number of retransmissions was used as an index for the time required to complete the retransmission, but this is not to be construed to be a limitation. It is also acceptable to use the number of retransmissions itself. Also, it is acceptable to find the average number of retransmissions until the packets can be correctly transmitted for each MCS, CQI or reception quality, and use the value (the number of retransmissions normalized according to the average number of retransmissions) of the number of retransmissions divided by the average number of retransmissions that corresponds to the current MCS, CQI or reception quality as an index for the time required to complete the retransmission.

Also note that the explanation above used an example of downlink packet communication for retransmission control, but the retransmission control can also be applied to uplink communication.

Thus, according to second embodiment, in a communication system composed of a base station 300 and a mobile station 400, the time required until the completion of retransmission of transmission packets is acquired, and, based on that required time, retransmission control is performed to change the order of the execution of the transmission packet retransmission and handover.

Also, regarding the change in the order of execution, retransmission control is performed such that the retransmission of the transmission packets is completed in the handover source system and then the handover is executed when the required time is equal to or greater than a predetermined threshold value, or the retransmission of the transmission packets in the handover destination system is executed when the required time is less than a predetermined threshold value.

By doing so, when it is likely that retransmission will be completed soon, the communication resources used in the transmission and retransmission processes until then will not be wasted by completing the retransmission by the handover source system. When it is likely that retransmission will continue for an extended time, the handover destination system can transmit by assigning more appropriate MCS to enable efficient communication, although communication resources will be wasted by transmission and retransmission up to that point.

According to the second embodiment, the mobile station 400 is provided with: the radio quality measuring section 205 that measures radio quality between systems; the ACK/NACK information generating section 404 that generates packet retransmission request signals based on error detection results of received packets; the handover request control section 403 that generates handover request signals related to the handover requests between systems; and the control section 401 that changes the order of execution of transmission of transmission packet retransmission request signals and transmission of handover request signals, based on the time required for completion of retransmission of transmission packets.

By doing so, when it is likely that retransmission will be completed soon, the communication resources used in the transmission and retransmission processes until then will not be wasted by completing the retransmission by the handover source system. When it is likely that retransmission will continue for an extended time, the handover destination system can transmit by assigning more appropriate MCS to implement a mobile station that is capable of efficient communication, although communication resources will be wasted by transmission and retransmission up to that point.

Also, by using the number of retransmissions as an index for the time required to complete retransmission corresponding to the required time, the decision process can be simplified. Also, by using a number of retransmissions normalized by the maximum number of retransmissions as the index for the time required to complete retransmission corresponding to the required time, it is possible to learn using a standardized method the status of advancement in the retransmission process even in communications mixed with different maximum number of retransmissions are set. Also, by using the value (the number of retransmissions normalized according to the average number of retransmissions) of the number of retransmissions divided by the average number of retransmissions that corresponds to the current MCS, CQI or reception quality as an index for the time required to complete retransmission, it is possible to more precisely learn the status of advancement in the retransmission process.

Embodiment 3

In the first embodiment described above, threshold value decision process is performed using information that relates to a predetermined number of retransmissions and that can be used as an index (an index for the time required to complete retransmission) that corresponds to the time required to complete a retransmission process, and the order of execution of the retransmission process and the handover process are controlled according to the determination results. However, in the third embodiment, threshold value decision processing is performed based on a soft NACK, and the control of the order of execution is performed according to the determination results, particularly on the premise that H-ARQ (Hybrid-ARQ) is applied as the automatic repeat request. Soft NACK is an index to indicate how much longer it will take until the reception succeeds. This can be found by synthesizing all of the reception qualities when the same packets are received (including the initial transmission and retransmission). In other words, the soft NACK can be used as an index for the time required to complete retransmission.

Figure 9:
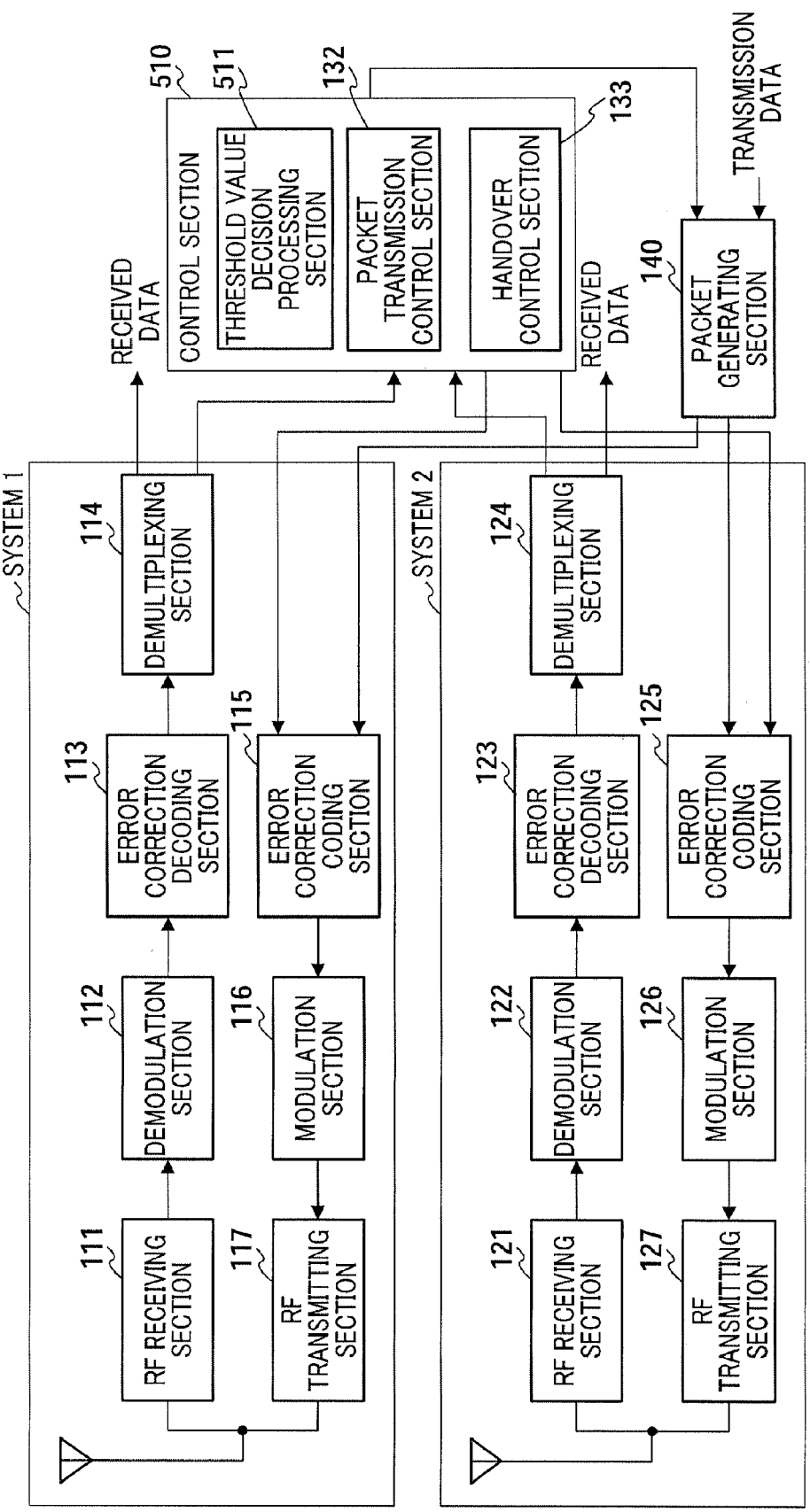
FIG. 9 is a block diagram showing a configuration of the base station in a third embodiment.

As shown in FIG. 9, the base station 500 has the control section 510 that is provided with a threshold value decision processing section 511.

At the control section 510, when the soft NACK is inputted, the threshold value decision processing section 511 compares a soft NACK as the index for the time required to complete retransmission and a predetermined threshold value to generate comparison result information.

Figure 10:
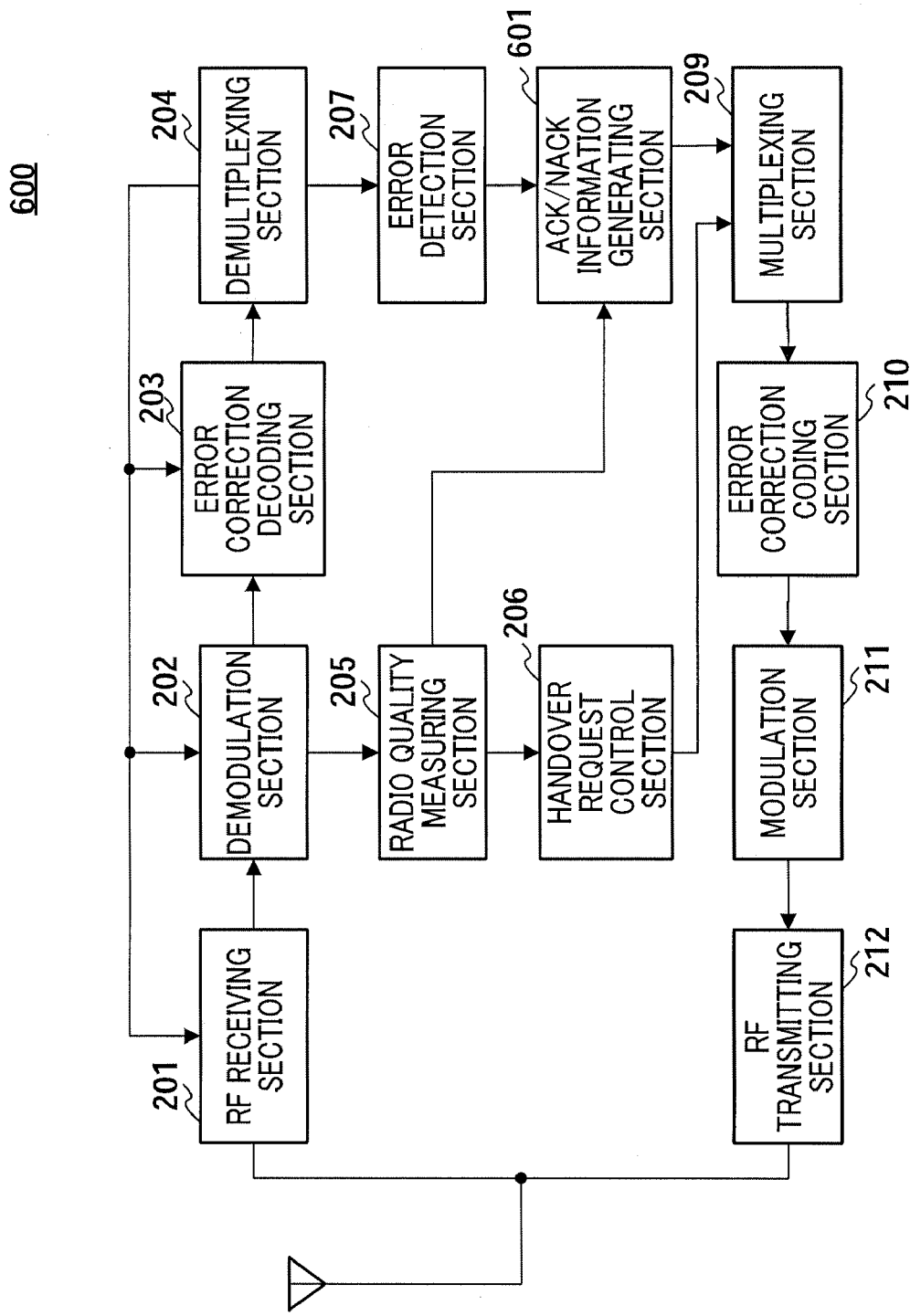
FIG. 10 is a block diagram showing a configuration of a mobile station according to the third embodiment.

As shown in FIG. 10, a mobile station 600 has an ACK/NACK information generating section 601. The ACK/NACK information generating section 601 differs from the ACK/NACK information generating section 208 of the mobile station 200 of the first embodiment. Instead of generating NACK, this generates a soft NACK using the measurement information in the radio quality measuring section 205. Soft NACK can use, for example, a full received power to noise power ratio that adds the received power to noise power ratios when the same packets are received (including at the initial transmission and at a retransmission).

In this way, according to the third embodiment, the packet generating section 140 that generates transmission packets and retains the transmission packets, and the control section 510 that controls the retransmission of the transmission packets based on the retransmission request from the mobile station 600 and controls the handovers between systems based on handover requests from the mobile station 600 are provided on the base station 500; the control section 510 changes the order of execution of retransmission of the transmission packets and the handover based on the time required until the completion of the retransmission of the transmission packets.

The base station 500 applies H-ARQ as the retransmission control method for the transmission packets and the control section 510 executes retransmission of the transmission packets prior to the handover when the full received power to noise power ratio obtained by sequentially adding the received power to noise power ratios relating to the same packet, as an index for the time required to complete retransmission that corresponds to the required time is equal to or greater than a predetermined threshold value.

By doing this, the full received power to noise power ratio is used as the index for the time required to complete retransmission, so it is possible to more precisely learn the progress of advancement of the retransmission process.

The first aspect of the retransmission control method of the present invention acquires the time required to complete a retransmission of a transmission packet and changes an execution order of the transmission of the transmission packet and a handover, based on the required time.

The second aspect of the retransmission control method of the present invention completes the retransmission of the transmission packet at a handover source system when the required time is equal to or greater than a predetermined threshold value, and then executes the handover, and executes the retransmission of the transmission packet at a handover destination system when the required time is less than the predetermined threshold value.

According to this method, when it is likely that retransmission will be completed soon, the communication resources used in the transmission and retransmission processes until then will not be wasted by completing the retransmission by the handover source system. When it is likely that retransmission will continue for an extended time, the handover destination system can transmit by assigning more appropriate MCS to enable efficient communication, although communication resources will be wasted by transmission and retransmission up to that point.

In the third aspect of the retransmission control method of the present invention, the change of the execution order is determined such that the retransmission of the transmission packet is executed before the handover when the number of retransmissions, the number of retransmissions normalized by a maximum number of retransmissions, or the number of retransmissions normalized by an average number of retransmissions, as an index for the time required to complete retransmission corresponding to the required time, is equal to or less than a threshold value.

According to this method, by using the number of retransmissions as an index for the time required to complete retransmission that corresponds to the required time, the decision process can be simplified. Also, by using the number of retransmissions normalized by the maximum number of retransmissions as the index for the time required to complete retransmission that corresponds to the required time, it is possible to learn using a standardized method the status of advancement in the retransmission process even in communications mixed with a different maximum number of retransmissions are set. Also, by using the value (the number of retransmissions normalized according to the average number of retransmissions) of the number of retransmissions divided by the average number of retransmissions that corresponds to the current MCS, CQI or reception quality as an index for the time required to complete retransmission, it is possible to accurately learn the status of advancement in the retransmission process.

The first aspect of the wireless control system of the present invention is a communication system that provides a mobile station, and a base station having a plurality of different systems to perform communications with mobile stations; the base station is provided with a transmission control section that controls retransmission of transmission packets based on a retransmission request from the mobile station, and a handover control section that controls handovers between the systems based on handover requests from the mobile station, and adopts a configuration that changes the order of execution of the retransmission of transmission packets and handovers based on the time required to complete the retransmission of the transmission packets.

According to this configuration, when it is likely that retransmission will be completed soon, the communication resources used in the transmission and retransmission processes until then will not be wasted by completing the retransmission at the handover source system. When it is likely that retransmission will continue for an extended time, the handover destination system can transmit by assigning more appropriate MCS to enable efficient communication, although communication resources will be wasted by transmission and retransmission up to that point.

The second aspect of the wireless communication system of the present invention adopts a configuration that executes the retransmission of the transmission packet before the handover when the number of retransmissions, the number of retransmissions normalized by the maximum number of retransmissions, or the number of retransmissions normalized by the average number of retransmissions, as an index for the time required to complete the retransmission corresponding to the required time, is equal to or less than the threshold value.

According to this configuration, by using the number of retransmissions as an index for the time required to complete retransmission that corresponds to the required time, the decision process can be simplified. Also, by using the number of retransmissions normalized by the maximum number of retransmissions as the index for the time required to complete retransmission that corresponds to the required time, it is possible to learn using a standardized method the status of advancement in the retransmission process even in communications mixed with a different maximum number of retransmissions are set. Also, by using a value (the number of retransmissions normalized according to the average number of retransmissions) of the number of retransmissions divided by the average number of retransmissions that corresponds to the current MCS, CQI or reception quality as an index for the time required to complete retransmission, it is possible to more precisely learn the status of advancement in the retransmission process.

The first aspect of the base station of the present invention is a base station comprising a plurality of different systems that perform communication with a mobile station, the base station comprising: a packet generating section that generates a transmission packet and retains the transmission packet; and a control section that controls a retransmission of the transmission packet based on a retransmission request from the mobile station, and that controls handovers between the systems based on a handover request from the mobile stations, and, in this apparatus, the control section changes the order of execution of the retransmission transmission packets and a handover, based on the required time to complete the retransmission of the transmission packet.

According to this configuration, when it is likely that retransmission will be completed soon, the communication resources used in the transmission and retransmission processes until then will not be wasted by completing the retransmission by the handover source system. When it is likely that retransmission will continue for an extended time, the handover destination system can transmit by assigning more appropriate MCS to enable efficient communication, although communication resources will be wasted by transmission and retransmission up to that point.

The second aspect of the base station of the present invention adopts a configuration wherein the control section executes the retransmission of the transmission packet before the handover when the number of retransmissions, the number of retransmissions normalized by the maximum number of retransmissions, or the number of retransmissions normalized by the average number of retransmissions, as an index for the time required to complete the retransmission corresponding to the required time, is equal to or less than the threshold value.

According to this configuration, by using the number of retransmissions as an index for the time required to complete retransmissions corresponding to the required time, the decision process can be simplified. Also, by using a number of retransmissions normalized by the maximum number of retransmissions as the index for the time required to complete retransmission that corresponds to the required time, it is possible to learn using a standardized method the status of advancement in the retransmission process even in communications mixed with different maximum number of retransmissions are set. Also, by using a value (the number of retransmissions normalized according to the average number of retransmissions) of the number of retransmissions divided by the average number of retransmissions that corresponds to the current MCS, CQI or reception quality as an index for the time required to complete retransmission, it is possible to more precisely learn the status of advancement in the retransmission process.

The third aspect of the base station according to the present invention, H-ARQ is applied as a retransmission control method for the transmission packet; and the control section executes the retransmission of the transmission packet before the handover when a full received power to noise power ratio obtained by sequentially adding the received power to noise power ratios of the same packet, as the index for the time required to complete the retransmission corresponding to the required time, is equal to or less than a predetermined threshold value.

According to this configuration, the full received power to noise power ratio is used as the index for the time required to complete retransmission that corresponds to the required time, so it is possible to more precisely learn the progress of advancement of the retransmission process.

The first aspect of the mobile station of the present invention is: a mobile station capable of communications with a plurality of systems, the mobile station comprising: a radio quality measuring section that measures a radio quality between the mobile station and the systems; a generating section that generates a retransmission request signal for a packet based on an error detection result of the packet; a signal generating section that generates a handover request signal for requesting a handover between the systems, according to the radio quality; and a control section that changes an order of an execution of the transmission of the transmission packet retransmission request signal and the transmission of the handover request signal, based on the required time to complete the retransmission of the transmission packet.

According to this configuration, when it is likely that retransmission will be completed soon, the communication resources used in the transmission and retransmission processes until then will not be wasted by completing the retransmission by the handover source system. When it is likely that retransmission will continue for an extended time, the handover destination system can transmit by assigning more appropriate MCS to enable efficient communication, although communication resources will be wasted by transmission and retransmission up to that point.

The second aspect of the mobile station of the present invention adopts a configuration where the control section executes a transmission of a retransmission request signal of the transmission packet before the handover request signal, when the number of retransmissions, the number of retransmissions normalized by the maximum number of retransmissions, or the number of retransmissions normalized by the average number of retransmissions, as an index for the time required to complete retransmission corresponding to the required time, is equal to or less than a predetermined threshold value.

According to this configuration, by using the number of retransmissions as an index for the time required to complete retransmission corresponding to the required time, the decision process can be simplified. Also, by using the number of retransmissions normalized by the maximum number of retransmissions as the index for the time required to complete retransmission that corresponds to the required time, it is possible to learn using a standardized method the status of advancement in the retransmission process even in communications mixed with different maximum number of retransmissions are set. Also, by using the value (the number of retransmissions normalized according to the average number of retransmissions) of the number of retransmissions divided by the average number of retransmissions that corresponds to the current MCS, CQI or reception quality as an index for the time required to complete retransmission, it is possible to more precisely learn the status of advancement in the retransmission process.

This application is based on Japanese patent application No. 2005-037812, filed Feb. 15, 2005, the entire content of which is expressly incorporated herein by reference.

INDUSTRIAL APPLICABILITY

The retransmission control method, base station and mobile station of the present invention are useful in enabling more efficient communication.

The invention claimed is:
1. A retransmission control method comprising:
transmitting transmission data to a receiving side;
acquiring a value which is obtained by dividing a number of retransmissions of the transmission data by a predetermined maximum number of retransmissions or an average number of retransmissions; and
controlling an execution order of a retransmission of the transmission data and a handover, based on the acquired value, wherein:
the retransmission of the transmission data is completed before executing the handover when the acquired value is greater than a predetermined threshold; and
the handover is executed before executing the retransmission of the transmission data when the acquired value is less than or equal to the predetermined threshold.

2. The retransmission control method according to claim 1, wherein the average number of retransmissions comprises an average of the number of retransmissions until the transmission data is correctly received at the receiving side for each modulation and coding scheme (MCS), channel quality indicator (CQI), or reception.

3. A base station comprising a plurality of different systems that perform communication with one or more mobile stations, the base station comprising: a transmitting section that transmits transmission data to the mobile stations; and a control section that controls a retransmission of the transmission data based on a retransmission request from the mobile stations, and that controls a handover between the systems based on a handover request from the mobile stations,
   wherein the control section controls an execution order of the retransmission of the transmission data and the handover, based on a value which is obtained by dividing a number retransmissions of the transmission data by a predetermined maximum number of retransmissions or an average number of retransmissions, wherein:
   the control section completes the retransmission of the transmission data before executing the handover when the value is greater than a predetermined threshold; and
   the control section executes the handover before executing the retransmission of the transmission data when the value is less than or equal to the predetermined threshold.

4. The base station according to claim 3, wherein:
   hybrid automatic repeat request (H-ARQ) is applied as a retransmission control method for the transmission data;
   the control section completes the retransmission of the transmission data before executing the handover when a full received power to noise power ratio, which is obtained by sequentially adding the received power to noise power ratios of the same data, is greater than a predetermined threshold; and
   executes the handover before executing the retransmission of the transmission data when the full received power to noise power ratio is less than or equal to the predetermined threshold.

5. A mobile station configured for communicating with a plurality of systems, the mobile station comprising:
   a radio quality measuring section that measures a radio quality between the mobile station and the systems;
   a generating section that generates a retransmission request signal for data based on an error detection result of the data;
   a signal generating section that generates a handover request signal for requesting a handover between the systems, according to the radio quality; and
   a control section that controls an execution order of a transmission of the retransmission request signal and a transmission of the handover request signal, based on a value which is obtained by dividing a number of retransmissions of the transmission data by a predetermined maximum number of retransmissions or an average number of retransmissions, wherein:
   the control section executes the transmission of the retransmission request signal before the transmission of the handover request signal, when the value is greater than a predetermined threshold; and
   the control section executes the transmission of the handover request signal before the transmission of the retransmission request signal, when the acquired value is less than or equal to the predetermined threshold.

* * * * *